Jan. 29, 1957  B. C. LOVATT  2,779,644
COMPRESSOR PISTON
Filed Feb. 8, 1954
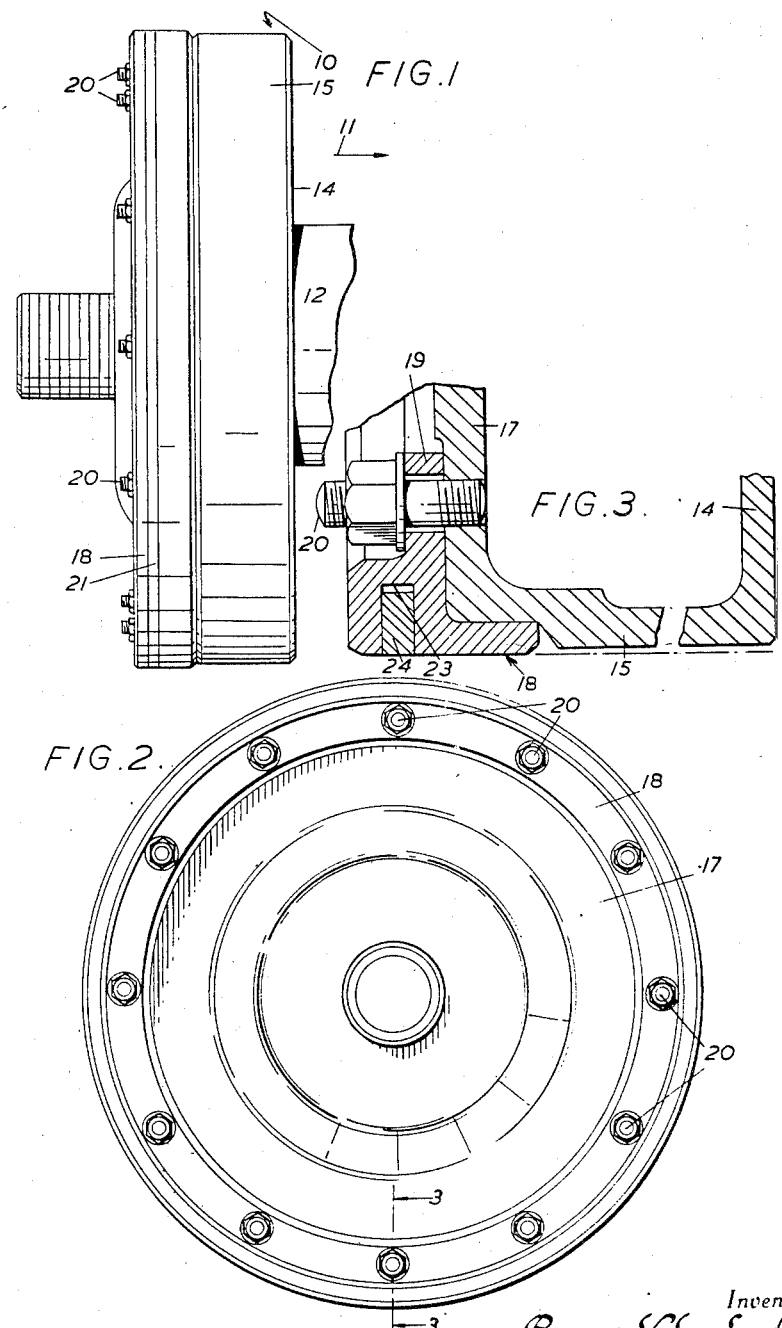
Inventor
*Bernard Charles Lovatt*
By *H. E. Jones*
Attorney

United States Patent Office 2,779,644
Patented Jan. 29, 1957

2,779,644

COMPRESSOR PISTON

Bernard Charles Lovatt, Sunbury-on-Thames, England, assignor to Alan Muntz & Company Limited, Hounslow, England Application February 8, 1954, Serial No. 408,921

11 Claims. (Cl. 309—4)

The present invention relates to pistons and is particularly concerned with compressor pistons for use in free-piston gas-generators or compressors.

In a free-piston engine there is very little side-thrust between the pistons and the cylinder walls, because most of the load on the compressor pistons is transmitted directly from the combustion piston along the piston rod or trunk connecting the compressor and combustion pistons. It is therefore not necessary to use the whole surface of the skirt of the compressor piston as a bearing surface to rub against the cylinder wall.

Compressor pistons as normally constructed, more particularly in free-piston gas-generators of the inward-compressing type, have one or more relatively narrow "bearing-bands," that is to say rings, of a suitable bearing alloy, fixed on to the skirt. Such a bearing band may be about 1 in. wide and about 3/16 in. thick for example, on a piston 20–30 in. in diameter, and may be fitted into a shallow groove in the piston skirt by soldering or riveting, or usually both. An advantage of this construction is that material with good wearing properties can be used for the bearing-band, while the material of the piston itself can be chosen purely for its structural properties.

However, these thin bands are difficult to fit securely, possibly because of the difference in thermal expansion between them and the piston. Another disadvantage is that after being fixed as securely as possible, they are difficult to remove and replace when they become worn.

In a piston of normal construction, the piston ring groove or grooves is or are turned in the piston itself, so that if a groove becomes worn, the groove has to be turned out to a larger size and an over-size ring fitted. As the compressor piston on a gas-generator may be 2 or 3 ft. in diameter, or more, turning out the groove requires a large lathe, which is not always available.

The present invention has for its object to provide a piston, particularly one of large size, in which the disadvantages referred to are removed or substantially reduced.

According to the present invention, the piston comprises a body portion, including the piston head, and, detachably mounted on the body portion, a ring member having one or more piston ring grooves and having a bearing portion adapted to bear upon the wall of the cylinder in which the piston is used.

This member may be of a suitable bearing alloy, such as bronze, while the body portion may be of a material chosen for its structural strength, such as steel. The ring member may be provided with an inwardly-projecting flange bolted to a flange of the body portion of the piston. It is preferably arranged that no part of the piston body or skirt bears upon the cylinder. Thus the only wearing surfaces, namely the ring or rings in the groove or grooves and the bearing portion of the ring member are on the detachable ring member which can easily be detached from the piston body and of which a replacement can readily be available.

One embodiment of the invention is hereinafter described, by way of example, with reference to the accompanying drawings in which:

Fig. 1 is a side elevation of a piston according to the present invention;

Fig. 2 is an end elevation of the piston shown in Fig. 1; and

Fig. 3 is an enlarged section on the line 3—3 of Fig. 2.

The piston shown is suitable for use as a compressor piston in a known form of inward-compressing, free-piston gas-generator having suction valves arranged around the cylinder wall close to its inner end, that is the end nearer the inner dead point. Thus the compressor piston 10 is adapted to effect compression during rightward movement in the direction of the arrow 11.

The piston 10 is mounted on a rod which is connected rigidly to the usual combustion piston 12. The piston, which may be of steel for example, comprises an inner piston head 14 and a skirt 15, the outer or left-hand end of the latter being of reduced diameter as shown in Fig. 3. A detachable member 18, made for example of bronze, of approximately L-shape in half cross-section, has one arm 19 of the L forming an inwardly-directed flange fixed by means of studs 20 to a flange 17 on the piston body and the other arm 21 constituting the bearing band adapted to contact with the cylinder wall shown in dash-dot lines in Fig. 3. The inner annular surface of this bearing band part 21 seats on the reduced diameter portion of the piston skirt 15 and stands proud radially of the skirt 15 so that engagement between the skirt and the compression cylinder wall is prevented.

The detachable member 18 has one or more piston ring grooves 23 in each of which is located a piston ring 24.

In operation and design it is necessary to arrange that the piston ring 24 does not over-run the suction valves. This is achieved by arranging the piston ring near the outer, or left-hand end of the piston as shown. Thus when the piston is at its inner dead point, the inner edge (that is the right-hand edge in Figs. 1 and 3) of the piston extends over the suction valves in the cylinder wall and the piston ring 24 is then just on the outer or left-hand side of the suction valves.

The bearing band part 21 of the detachable member 18 is preferably made long enough to extend axially inward (that is, to the right in Fig. 3) from the piston ring groove 23 for distance equal to about a quarter of the total length of the piston 10.

The inwardly-directed flange 19 on the detachable member 18 serves not only for fixing that member to the piston body 13, but also stiffens the member 18, and resists deformation thereof when not fitted to the piston.

I claim:

1. A free piston compressor piston comprising a body portion and a skirt portion of a metal selected for strength properties and a ring member of another metal selected for bearing properties and detachably mounted on said body portion and having an annular bearing part of greater diameter than said skirt portion, the skirt portion having an axial length substantially greater than the axial length of the ring member.

2. A free piston compressor piston comprising a body portion and a skirt portion of a metal selected for strength properties and a ring member of another metal selected for bearing properties and of L-shape half cross-section detachably mounted on the outer end of said body portion and having an annular bearing part of greater diameter than said skirt portion, the skirt portion having an axial length substantially greater than the axial length of the ring member.

3. A free piston compressor piston comprising a body portion and a skirt portion of a metal selected for strength properties and a ring member of another metal selected for bearing properties and detachably mounted on said body portion and having an annular bearing part of greater diameter than said skirt portion, the skirt portion having an axial length substantially greater than the axial length of the ring member, a ring groove in said annular bearing part and a sealing ring in said groove.

4. A free piston compressor piston comprising a body portion and a skirt portion of a metal selected for strength properties and a ring member of another metal selected for bearing properties and of L-shape half cross-section detachably mounted on the outer end of said body portion and having an annular bearing part of greater diameter than said skirt portion, the skirt portion having an axial length substantially greater than the axial length of the ring member, a ring groove in said annular bearing part and a sealing ring in said groove.

5. A free piston compressor piston comprising a piston body and a piston skirt of a metal selected for strength properties, said body having a reduced diameter portion at one end, a ring member of another metal selected for bearing properties and detachably mounted on said body and having an annular bearing part fitting with its inner surface on said reduced diameter portion and its outer surface proud of said skirt, the skirt portion having an axial length substantially greater than the axial length of the ring member.

6. A free piston compressor piston comprising a piston body and a piston skirt of a metal selected for strength properties, said body having a reduced diameter portion at one end, a ring member of another metal selected for bearing properties and detachably mounted on said body and having an annular bearing part fitting with its inner surface on said reduced diameter portion and its outer surface proud of said skirt, the skirt portion having an axial length substantially greater than the axial length of the ring member, a ring groove in said annular bearing part and a spring ring in said grove.

7. A free piston compressor piston according to claim 2 having screw bolts fastening said ring member to said body portion.

8. A free piston compressor piston according to claim 5 having screw bolts fastening said ring member to said body.

9. A free piston compressor piston according to claim 2 in which the axial length of said annular bearing part is approximately one quarter of the axial length of the piston.

10. A free piston compressor piston according to claim 5 in which the axial length of said annular bearing part is approximately one quarter of the axial length of the piston.

11. A free piston compressor piston having a body portion, an end flange and a skirt of a metal selected for strength properties, said skirt having adjacent said end flange an annular part of reduced diameter, a ring member of another metal selected for bearing properties and having a flat annular part secured to said end flange and a cylindrical part fitting on to said reduced diameter part, said cylindrical part of said ring member being of greater diameter than said skirt and having a ring groove therein, and a spring ring in said groove, the skirt portion having an axial length substantially greater than the axial length of the ring member.

References Cited in the file of this patent
UNITED STATES PATENTS

| 365,102 | See | June 21, 1887 |
| 1,283,091 | Crawford | Oct. 29, 1918 |
| 1,481,909 | Jones | Jan. 29, 1924 |
| 1,701,355 | Borland | Feb. 5, 1929 |
| 2,452,194 | Huber | Oct. 26, 1948 |
| 2,462,745 | Horgen | Feb. 22, 1949 |